United States Patent [19]
Osborne

[11] Patent Number: 5,653,510
[45] Date of Patent: Aug. 5, 1997

[54] WHEEL RIMS

[75] Inventor: Pippin Osborne, West Vancouver, Canada

[73] Assignee: Syncros Applied Technology Incorporated, Vancouver, Canada

[21] Appl. No.: 604,534

[22] Filed: Feb. 21, 1996

[51] Int. Cl.⁶ .................................................. B60B 21/00
[52] U.S. Cl. .................................................. 301/95; 301/30
[58] Field of Search .................................. 301/30, 33, 55, 301/58, 95, 96, 97, 98, 99

[56] References Cited

U.S. PATENT DOCUMENTS

| 4,702,528 | 10/1987 | Sacks | 301/99 |
| 4,938,540 | 7/1990 | Sacks . | |
| 5,228,756 | 7/1993 | Krampera | 301/95 X |
| 5,470,133 | 11/1995 | Kuo et al. . | |

FOREIGN PATENT DOCUMENTS

| 0429104A1 | 5/1991 | European Pat. Off. . | |
| 1001618 | 2/1952 | France | 301/97 |
| 1045279 | 11/1953 | France | 301/58 |
| 293203 | 11/1989 | Japan | 301/99 |

*Primary Examiner*—Russell D. Stormer
*Attorney, Agent, or Firm*—C. A. Rowley

[57] ABSTRACT

Lightweight wheel rims for bicycles are formed by pin joints wherein a pin traverses the joint connecting a pair of adjacent ends of a rim member and extend into passages in the rim member on opposite sides of the joint. The improved joint is formed by resilient arms on the pin (or passage) that are resiliently bent or bowed between a pair of spaced contact areas when the pin is forced into the passage and apply pressure resiliently between the pin and the passage wall so the force are applied to inside walls of the passage so that more deflection occurs in the arms as opposed to the rim. In another embodiment of the present invention circumferentially spaced vents are formed leading from the circumferential pin receiving passages to the spoke holes.

17 Claims, 5 Drawing Sheets

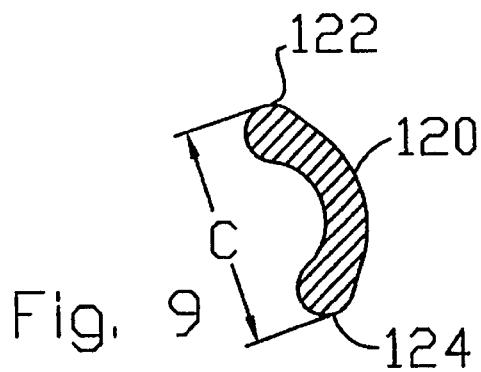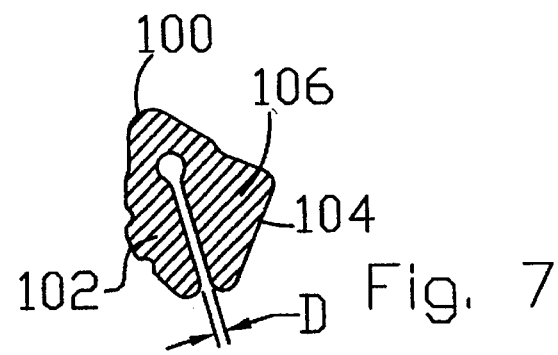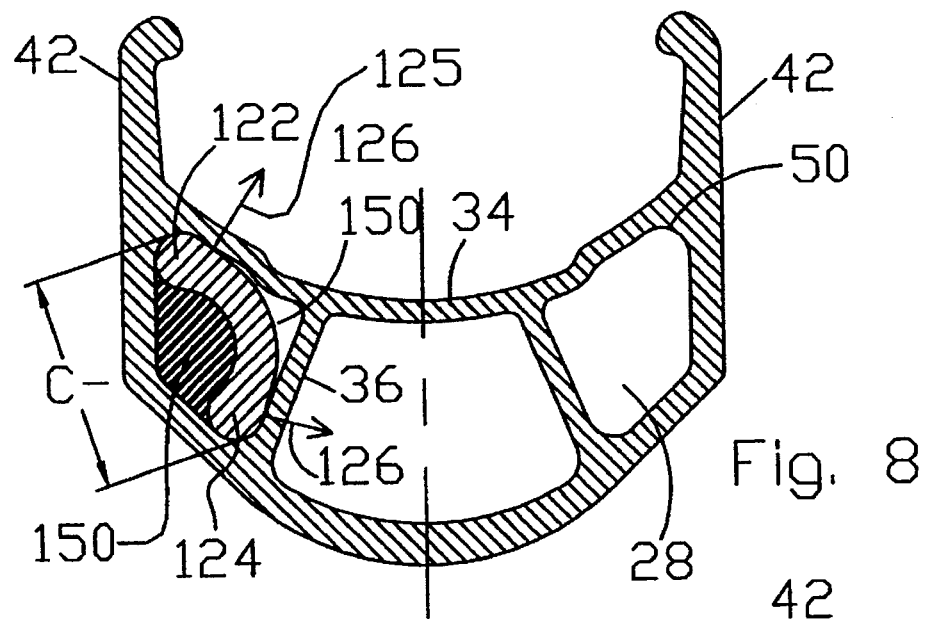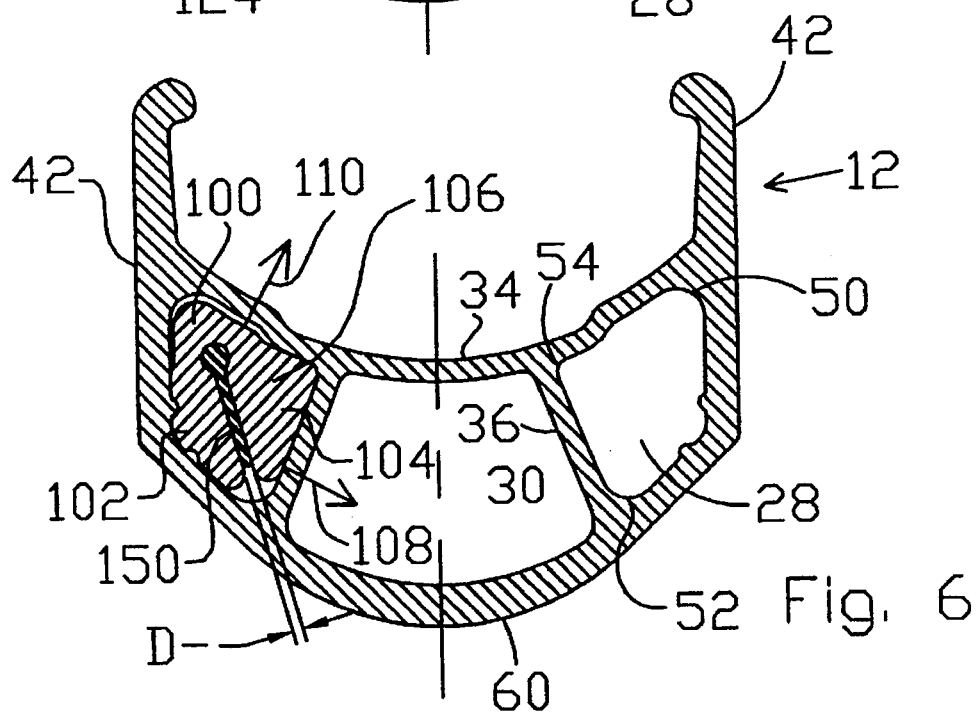

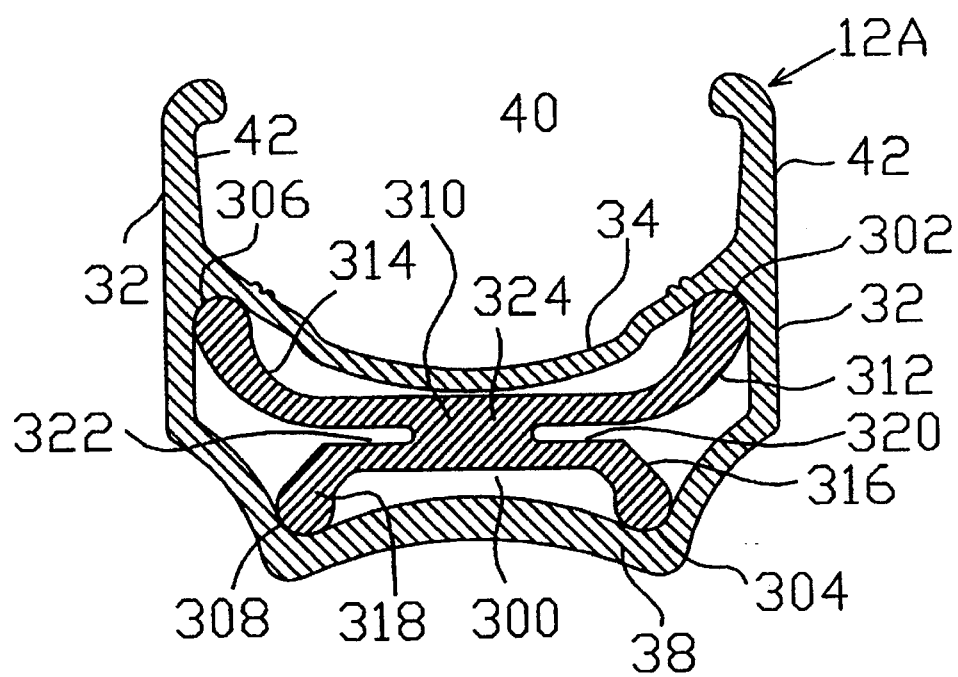
Fig. 10
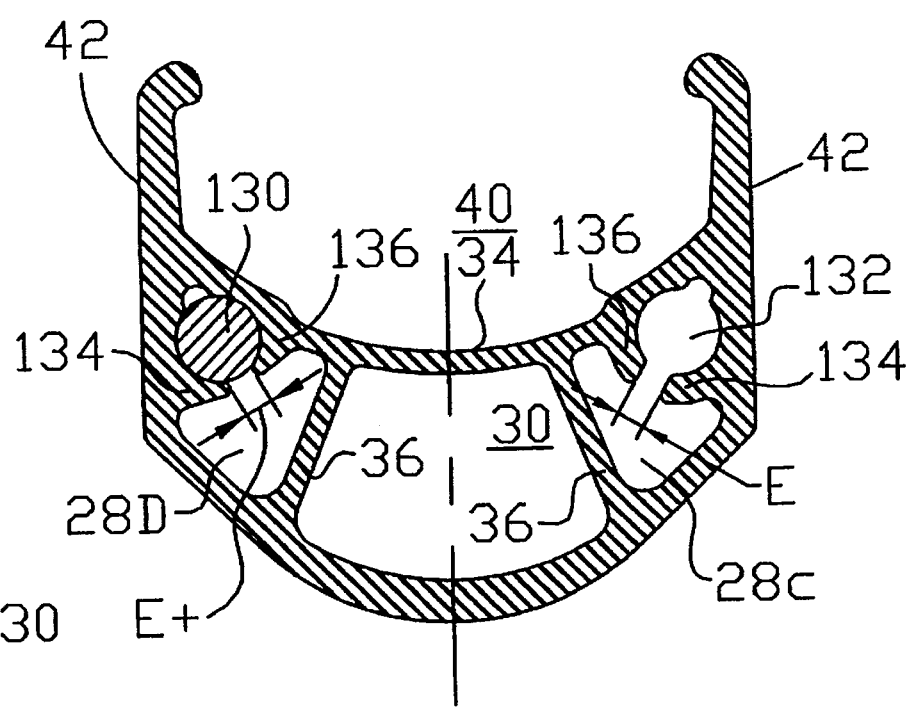
Fig. 11
Fig. 12

WHEEL RIMS

FIELD OF INVENTION

The present invention relates to an improved wheel rim, more particularly, the present invention relates to self draining lightweight rims and to a system of joining a rim member to form it into a circular wheel rim.

BACKGROUND OF THE INVENTION

High performance wheel rims for bicycles in particular, mountain bike, are generally formed by an extrusion process to provide a continuous length of extruded material that is coiled which then cut into rim forming members, i.e. discrete lengths each of which is formed into a hoop or circular rim with its ends joined together to form an annular wheel rim. One such technique for manufacturing rims is described in European patent application 0429104 A1 published May 21, 1991, inventor Best et al.

Friction or force fit pin joints are one of the more popular type of joints used to connect the ends of an extruded rim member together to form the circular wheel rim. Normally, such pin joints demand the use of thick walled passages into which the pins are forced. The requirement for thick walled passages is to limit deformation of the rim, since any distortion of the rim in a high performance bicycle, acts negatively on performance and may result in poor brake performance such as brake grabbing.

Recently issued U.S. Pat. No. 5,470,133 issued Nov. 28, 1995 to Kuo et al. shows what is described as an improved force pin joint wherein a specific type of threaded pin is used, in this case, rotating pins which tend to wind themselves into the holes or passages on opposite sides of the joint as the ends of the rim member are forced together to form the wheel rims. These pins are stated to produce a better joint than is obtainable using simple force fit pins.

The concept of using force fit pins joints similar to that described in the U.S. Pat. No. 5,470,133 (but without threads) is shown in the U.S. Pat. No. 4,938,540 issued Jul. 3, 1990 to Sacks. This patent describes a solution to a further problem that is sometime encountered, namely, leakage of fluids into or out of the passages formed in the rim member and into which the pins are received. In this patent, an epoxy resin or the like is used to form a hermetic seal sealing the opposite ends of the passage, i.e. around the joining pin) so that there can be no leakage into or for that matter, out of the passage.

Rim weight is a very important consideration in high performance bicycle, such as high performance mountain bikes, thus, the lighter the rim, provided it meets the other structural requirements, the better. Clearly, to produce a lighter rim from a given material requires the amount of material used in the rim be reduced to a minimum. However, as above indicated, when the wall thickness is too small and force fit pins are used such as force fit pins described by Sacks or Kuo et al., the rim becomes deformed by the pins thereby leaving a high spot or expanded area on the lateral surface of the wheel rim which particularly if not properly dealt with in the finishing operation may interfere with the smooth operation of the brakes.

BRIEF DESCRIPTION OF THE PRESENT INVENTION

It is an object of the present invention to provide a lightweight rim, more particularly, it is an object of the present invention to provide a pin connecting system for a lightweight wheel rim structure.

It is also an object of the present invention to provide a drainage or venting system for pin receiving internal passages in the rim.

Broadly, the present invention relates to a wheel rim comprising a circumferentially extending rim member, coupling means forming a joint connecting adjacent ends of said rim member to form said wheel rim, passage means in said rim member extending circumferentially of said wheel rim, said coupling means including pin means extending circumferentially of said rim across said joint and extending along and cooperating with said passage means on opposite circumferential sides of said joint, at least one of said passage means and said pin means having resiliently bendable arm means, said arm means contacting said other of said passage means and said pin means along areas spaced circumferentially around a cross sectional shape of said passage means with said arm means being subjected to resilient bending stresses between said areas when said arm means are forced from a relaxed condition to a resiliently bent condition when said pin means is forced into said passage means and wherein arm means in said resiliently bent condition applies pressure in said areas against said other of said pin means and said passage means to retain said pin means in said passage means and hold said joint in closed position forming said wheel from said rim member.

Preferably, said arm means are an integral part of said pin means.

Preferably, the cross-section of said passage means and its cooperating pin means are shaped to position said areas to stresses apply forces from said deformed arm means to said passage means having major force components at said areas directed to minimize lateral bulging at said joint.

Preferably, said passage means will have at least one pair of filleted corners and at least one pair of adjacent of said areas will be located in corners of said at least one pair of corners.

Preferably, said passage means comprises a pair of passages positioned one adjacent to each side edge of said rim.

Preferably, said passage means will further comprise a third passage will be positioned between said pair of passages.

Preferably a setable material will substantially fill space between the inner periphery of said passage and said arm means, said material having a compression strength when set sufficient to prevent movement of said arms means to said relaxed condition.

Preferably said at least one pair of corners will include a corner positioned adjacent to an outside wall of said passage means and at a radial outward side of said passage.

Broadly the present invention also relates to a hollow wheel rim structure formed from a rim member coupled together at a joint to form said wheel rim comprising at least a pair of passages extending circumferentially of said rim, one adjacent to each side of said rim, spoke holes formed in a bottom of said rim and a venting hole through walls of said passages radially of outward of said wheel relative to each said spoke hole, said venting passages connecting said passages with said spoke holes to permit fluid flow from said passages.

Preferably, said rim is provided with a top wall spaced radially outward of said bottom and defining a central passage between said pair of passage, each said spoke hole include a first hole extending through said top wall of said central passage and a second hole extending through said bottom of said rim, said second hole being smaller in diameter than said first hole and said first hole having a diameter to traverse an adjacent wall of one of said passages to provide said drain holes.

Preferably, said spoke holes are offset on opposite sides of said central plane, said first holes of said spoke holes offset to one side forming drain holes in one of said pair of passages on said one side, and said first holes on the opposite side of said central plane forming drain hole the other of said pair of passages.

BRIEF DESCRIPTION OF THE DRAWINGS

Further features, objects and advantages will be evident from the following detailed description of the preferred embodiments of the present invention taken in conjunction with the accompanying drawings in which;

FIG. 6 is a view similar to FIG. 3 but illustrating a different form of pin member.

FIG. 7 shows the pin member shown in FIG. 6 in expanded position.

FIG. 8 is a view similar to FIG. 6 showing yet another form of pin member.

FIG. 9 shows a pin member of FIG. 8 in expanded or relaxed condition.

FIG. 10 has a cross-section of a single passage rim with a pin of an appropriate cross sectional shape therein.

FIG. 11 shows a modified version of the present invention when cantilever arms are provided on internal walls of the passage.

FIG. 12 shows a simple round pin for use in the FIG. 10 embodiment.

DESCRIPTION OF PREFERRED EMBODIMENTS

Figure 1:
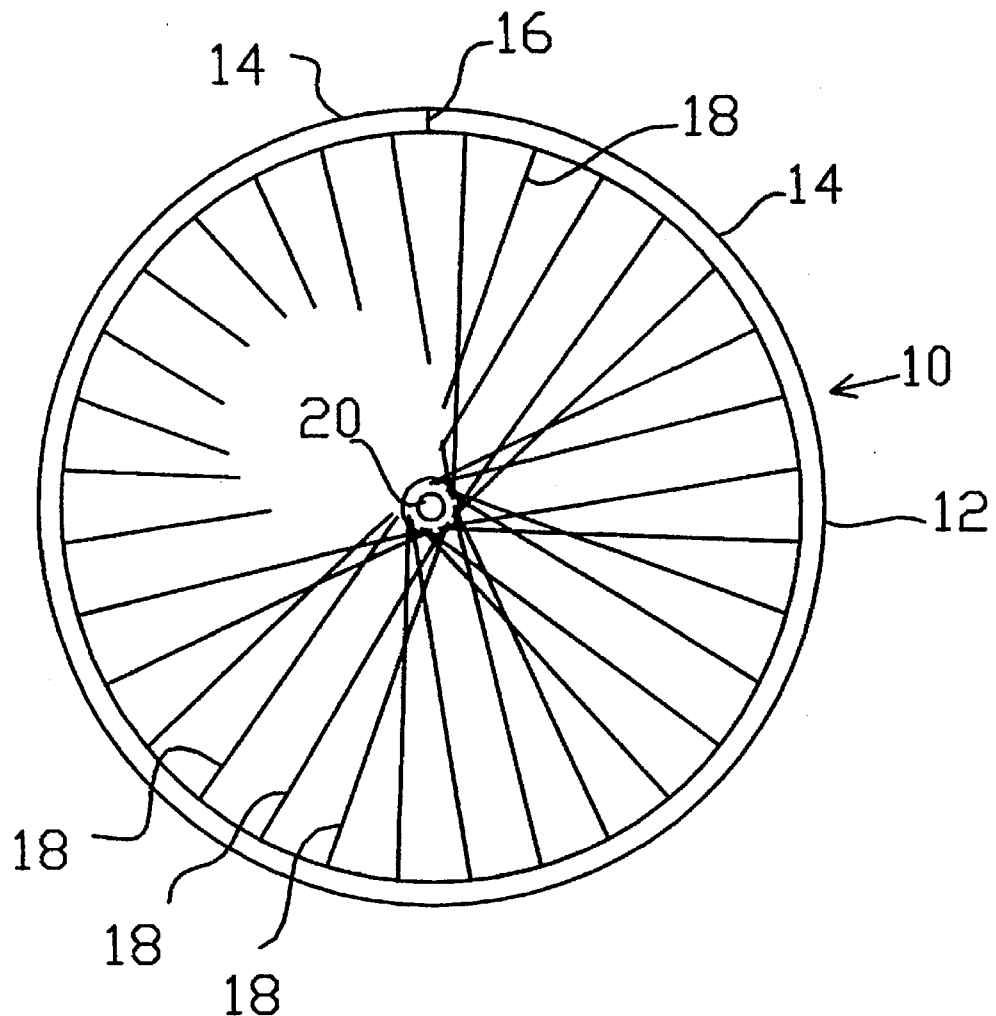
FIG. 1 shows a typical rim structure with spokes, as contemplated for the present invention.

A typical wheel is illustrated at 10 in FIG. 1 and is composed of a rim 12 formed by a rim member 14 joined together at a joint 16 to form the loop or completed wheel rim 12. A plurality of spokes as indicated at 18 extend from the rim 12 to a central hub 20 which has a pair of axially spaced flanges to which ends of selected spokes 18 are secured to one flange or the other in known manner. Most conventional wheels are formed in this manner, but the present invention may, also be used with other forms of wheels such as disk or trispoke type wheels.

The type joint for forming the wheel rim from the rim member used in the present invention includes at least one pin element 22 received in opposite ends 24 and 26 of a passage 28 formed in the extruded rim member 14 and extending completely around, i.e. circumferentially of, the rim 12. Thus the pin element(s) extend circumferentially of the rim 12 across the joint 16 to sections 24 and 26 of the passage 28. The rim structures may be provided with a single passage 28 and corresponding pin 22 or a plurality of passages 28 and cooperating pins 22, In one of the preferred constructions there will be a pair of passages 28 (28A and 28B to be described below) positioned one at each lateral side of the rim 12.

Figure 3:
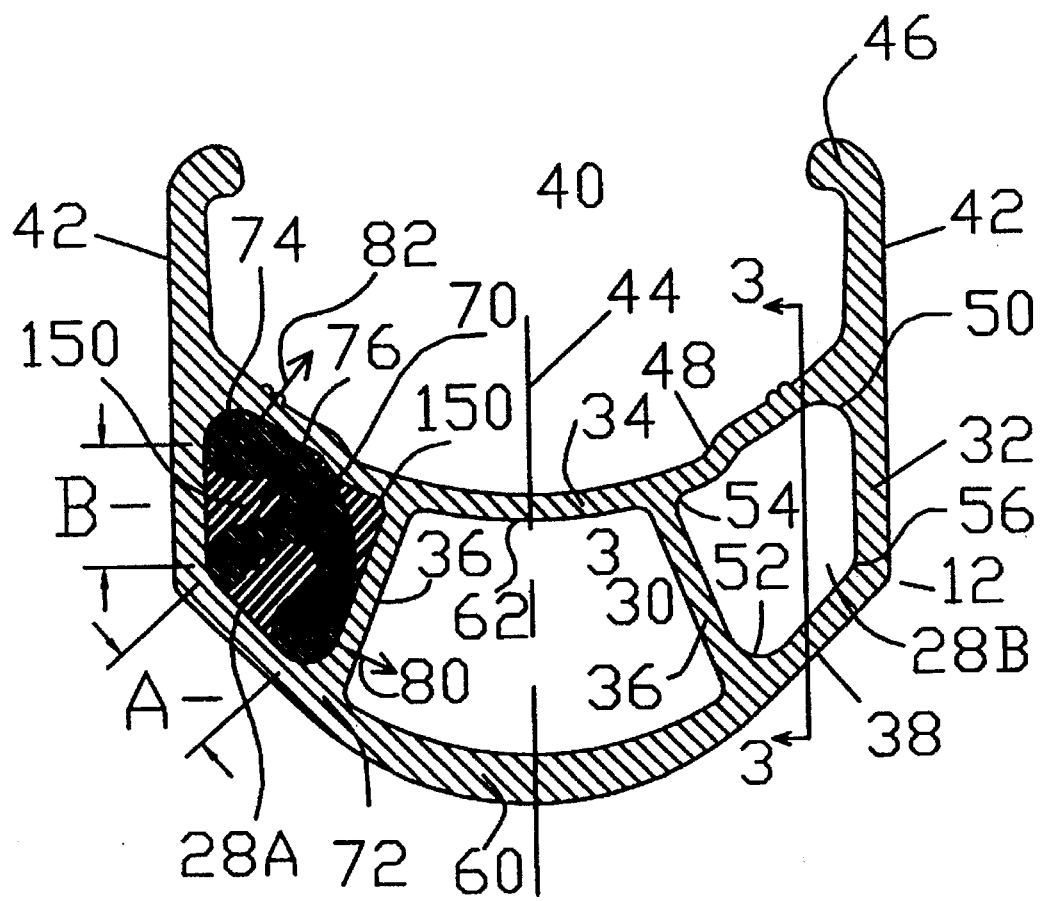
FIG. 3 is a section on line 3—3 of FIG. 2 and extending along the face of the butt joint of the rim member to form the rim.

FIG. 3 illustrates a wheel rim formed with a cross-section having a pair of joint forming passages 28 (indicated at 28A and 28B) with an intermediate or central passage 30 therebetween. All of these passages extend completely around rim 12 circumferentially of the rim 12 and will be formed as the rim member 14 is extruded. The passages 28 are formed by outer wall 32 (an extension of range 42 in the illustrated arrangement), a top wall 34, an inner wall 36, and a bottom wall 38. The top wall 34 extends completely across the bottom of the tire rim receiving cavity 40 and interconnects the two side (tire retaining) flanges 42 on opposite sides of the central plane 44. The bottom wall 38 also interconnects the walls 32 (i.e. radially inner ends of flanges 24) and as will be described below includes the bottom wall 60 of the central passage 30.

The rim 12 in the illustrated embodiment is symmetrical on opposite sides of the plane 44, the passages 28A on one side of the plane 44 is a mirror image of the passage 28B on the opposite side of plane 44 and only one passage will be described in detail.

As shown, each side of the side flanges 42 is formed with a bead or rim 46 to retain the bead of the tire (not shown). The bottom of the cavity 40 as formed by the wall 34 has a minor discontinuity as indicated at 48. This dip or discontinuity 48 which, since the thickness of the wall 34 is substantially constant across the full width of the rim 12, defines a similar discontinuity in the passage 28, i.e. 28A or 28B.

Each of the passages 28 (28A or 28B) has a roughly rhomboidic cross-sectional shape and has first pair diagonally opposed filleted corners 50 and 52 and a second pair of diagonally opposed corners 54 and 56. The corners 50 and 54 are formed at the radial extremities (relative to the hub 20) of the outer wall 32 and the inner wall 36 respectively of the passage 28. The two corners 52 and 56 are positioned at a minimum radial spacing of the walls 32 and 36 respectively from the hub 20.

The central passage 30 is similarly roughly rhomboidic in shape with a substantially parallel walls as indicated at 60 and 62 (60 being a portion of bottom wall 38 i.e. radially inner wall of the rim 12 and 62 being a portion of top wall 34 which forms the top of passage 30 and bottom of the cavity 40). It can be seen that the shape of the rim member 14 permits the cross section of the various walls to be thin compared with other rims formed with conventional pin joints (see the above U.S. Pat. Nos. 4,938,840 and 5,470,133 as examples).

Figure 2:
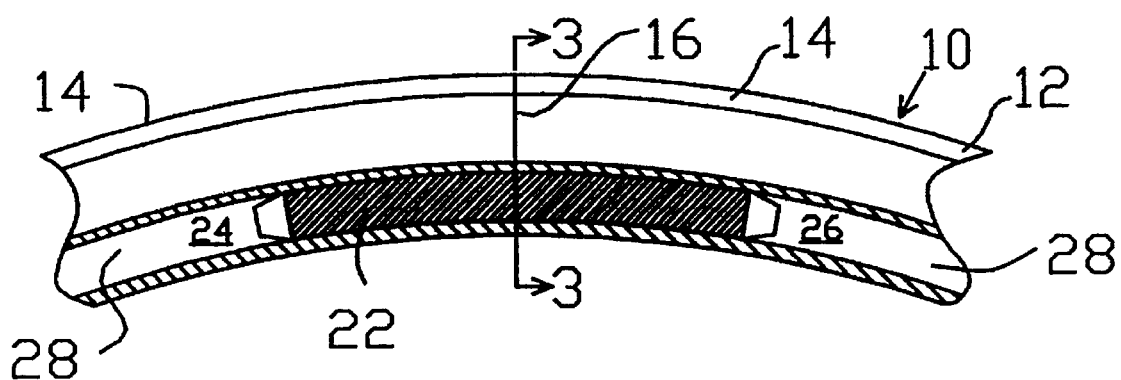
FIG. 2 shows a partial cross-section along the line 2—2 of FIG. 3 illustrating the joint connection.

The use of thin section is made possible by the structure of the pin coupling as generally indicated by the pin 22 in FIG. 2. Generally only one pin will described for each embodiment, but it is apparent that there is a pin 22 for each passage 28.

Figure 5:
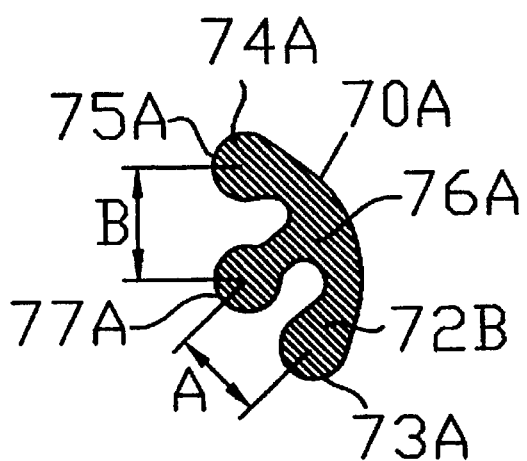
FIG. 5 shows a similar form of pin member with minor revision.
Figure 4:
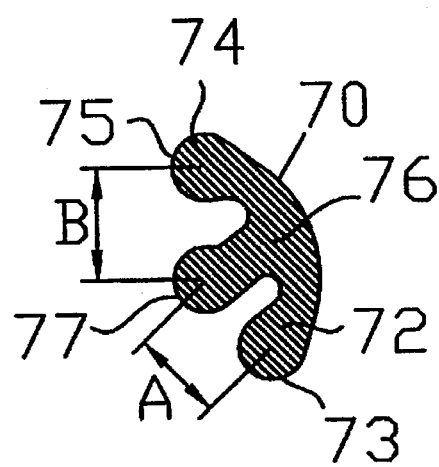
FIG. 4 shows one form of pin member.

In FIGS. 3, 4 and 5, embodiment the pin element 22 has the form of a substantially T-shaped pin 70 formed having a top bar that forms a pair of resiliently bendable arms 72 and 74 which extend from a stem 76 of the T-shaped member. The top of the T forms a pair of arms 72 and 76 which are shaped at their extremities 73 and 75 to match essentially with the curvature of a pair of opposed filleted corners 50 and 52 of the passage 28 and form spaced areas of contact between the passage 28 and the pin element 22 i.e. areas spaced circumferentially of the passage 28. The stem 76 has its extremity 76 curved to match with the curvature of one of the other pair of opposed corners corner 56 located at the junction of the side wall 36 and bottom wall 38.

In FIG. 4, in a pin 70 is shown in relaxed condition so that the center line of the free end of the arm 72 (area of contact) is spaced from the center line of the stem 76 by a distance A and similarly, the free end of the arm 74 (area of contact) is spaced from the center line of the stem 76 by a distance B.

When the pin 70 is inserted in passage 78, the distance between the center line of the stem of the arm 72 from the center line of the stem 76 is A−, i.e. it has been reduced so that there is a resilient force of the arm trying to unbend forcing the arm 72 against the inner wall 34 of the cavity 28 (see the force arrow 80 in FIG. 3).

Similar movement of pins 70 in position in the passage 28 forces the arm 74 toward the stem 76 and reduces the distance between the center line of the end of the arm 74 and of the stem 76 as indicated at B−. Such deformation of the arm 74 due to the resilient bending of the arm between the spaced areas of contact provides a resilient force in the direction of the arrow 82 resiliently pressing the end of the arm 74 against the inner periphery of the passage 28 to thereby hold the adjacent ends of the rim member 14 together to form a rim 12. Forces are also generated between the end 77 of the stem 76 and the fillet 56.

It will be apparent that the resilient deformation of the arms 72, 74 and/or 76 in bending between spaced areas of contact with the inner periphery of the passage 28 anchor or fix the joint 16

FIG. 5 shows a pin similar to the pin 70 of FIGS. 3 and 4. However, the central stem 76A has been made narrower and gaps between the arms 72A and 74A and the central stem 76A have been increased so that the flexibility of the pin 70A is greater than that of the pin 70 assuming both have been made of the same material.

FIG. 6 shows essentially the same rim structure 12 as described above but uses a different pin element 100. This pin 100 is a substantially U-shaped member having arms 102 and 104, with the arm 104 provided with a shoulder or the like 106. The gap or spacing between the arms 102 and 104 is indicated by the dimension D in FIG. 7 with the pin in relaxed condition. In the illustrated arrangement the pin 100 is inserted into the passage 28, with the bridging end of the U-shaped member received by the fillet in corner 50, the arm 102 extends along the outer bottom wall 38 and the side wall 32 of passage 28 while the projection 106 of the arm 104 is received within the corner fillet 54 of the passage 28. When the pin 100 is forced into the cavity 28, the gap between the two arms 102 an 104 is reduced to a dimension D by resiliently bending the pin 100− so that the resilience in the material from which the arms are made tends to open the gap and thereby apply pressure to the inner wall 36 of the passage 28 as indicated by the arrow 108 against the inner top wall 34 as indicated by the arrow 110.

As with the previous embodiment, the forces are applied basically to the inner walls 34 and 36. This orientation of the forces between the pin 22 and its various embodiments preferably directs the forces toward the inside of the rim 12, i.e. predominantly in a direction sloped between radial of the wheel and the central plane 44.

FIGS. 8 and 9 show yet another modification of the present invention. In this case, the pin 120 has a substantially C-shaped cross section with its end spaced by a distance indicated at C with the pin relaxed, but when the pin 120 is resiliently bent i.e. bowed by the ends 122 and 124 being forced toward each other when the pin 22 is forced into the passage 28, this distortion of the pin applies pressure against the wall of the passage to hold the joint 16 together. The pin 120 has its one end 122 received within the corner fillet 50 and its opposite end received in corner fillet 52 at diagonally opposite sides of the passage 28 so that the dimension between the ends 122 and 124 is now smaller than C as indicated by the dimension C− in FIG. 8 which as above described generates a pressure as indicated by the arrow 126 toward the inner wall 36 and a similar pressure 128 against the inner top wall 34 in a similar manner to the forces generated by the pins of the other embodiment i.e. in directions primarily radially of the wheel and toward the central plane 44.

FIG. 10, shows a rim 12A is similar to the rim 12 described above but with the partitions or inner walls 36 removed so that the passages 28A, 28B and 30 are all interconnected to form a single passage 300 extending circumferentially of the rim 12A. The passage 30 has filleted corners 302, 304, 306 and 308. An H-shaped pin 310 is used for coupling the rim member end together to form the joint 22. This pin 310 has a first pair of resiliently bent legs 312, 314 formed to project into the cavities or corners 302 and 306 by bending the legs 312 and 314 in a downward direction, i.e. radially inward direction relative to the wheel rim 12A, and a second pair of resiliently bent legs 316 and 318 which cooperate with the corners 304 and 308 in much the same manner as the arms 312 and 314 cooperated with the corners 302 and 306 but in the case of the legs 316 and 318, they are bent radially outward relative to the wheel rim 12A, i.e. bending of the legs 312, 314, 316 and 318 tend to close the gaps 320 and 322 positioned between the legs 312 and 316 and 314 and 318 respectively. The H shape of the pin 310 is completed by the connecting portion 324.

It will be apparent that the bending of the legs 312, 314, 316 and 318 and the relative force supplied to the rim 12A by the pin 310 are primarily radial forces and have only a minor lateral or axial component relative to the rim 12A.

FIGS. 11 and 12 show a different configuration for retaining the pins and permitting the construction of relatively lightweight rim by maintaining the thickness of the walls, i.e. the total material used in the rim is small. In this case, a substantially round pin 130 is forced into a round hole 132, one side of which is defined by a pair of resilient arms 134 and 136. The gap between these arms in relaxed condition is illustrated as having a dimension E in the right hand cavity 28C in FIG. 10. However, when the rod or pin 130 is inserted into the hole 132 as indicated on the left side of FIG. 10, this gap increases in dimension as indicated by the dimension E+ so that forces trying to return the arms to their relaxed position are applied to the pin 130 to hold the joint together. While this construction will be effective in some cases it obviously requires more material as the arms 136 extend around the full circumference of the wheel and the material used to provide the resilient characteristics to the arm is the same material as the rim 12 which applies limitations to the materials that may be used as compared with the other embodiments where the arms are part of the pin.

It will be noted that in all of the embodiments described above, the forces acting on the wheel rim, all act on inside walls as opposed to the outside walls, such as outer side walls 42 of the rim. Thus, there is little tendency for the exposed side wall of the rim to be deformed. Yet, the rim member is securely held in loop form by the resilient pressure of the arms against the walls of the passages in which the pins are received.

It is generally preferred to fill the passage 28 in the area of the pins such as the pins 7, 100, 120 or 130 with a suitable filling material such as epoxy resin as indicated at 150 in FIGS. 3, 6 and 8 respectively. This epoxy resin hardens after the pin has been inserted and resist any deformation of the pin 22 i.e. return to its relaxed condition, thereby even more firmly anchoring the pin in its passage and better ensuring that the joint remains rigid. The epoxy also may act as an adhesive between the pin and the walls of the passage 28 to more firmly anchor the pin in position and better secure the joint.

In some cases where a substantially incompressible adhesive material such as the epoxy resin described above is not used it may still be advantageous to use a simple adhesive to more firmly lock the pin in position in the passage.

In the illustrations of FIGS. 3, 6 and 8, only one pin has been shown in position within the cavity. But obviously, there would be two pins, one position in each of the cavities 28A and 28B or 28C and 28D in FIG. 11 embodiment.

Figure 13:
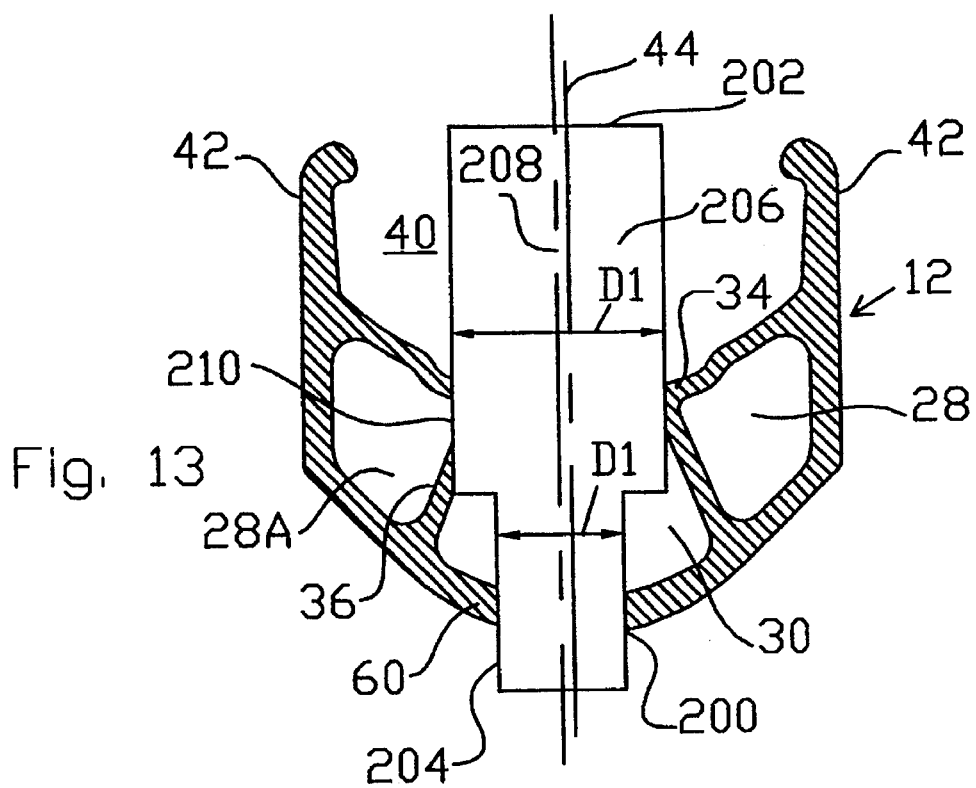
FIG. 13 shows a drill drilling to the left side of the central plane of the rim and form a venting opening in the passage on one side of the central axis.
Figure 14:
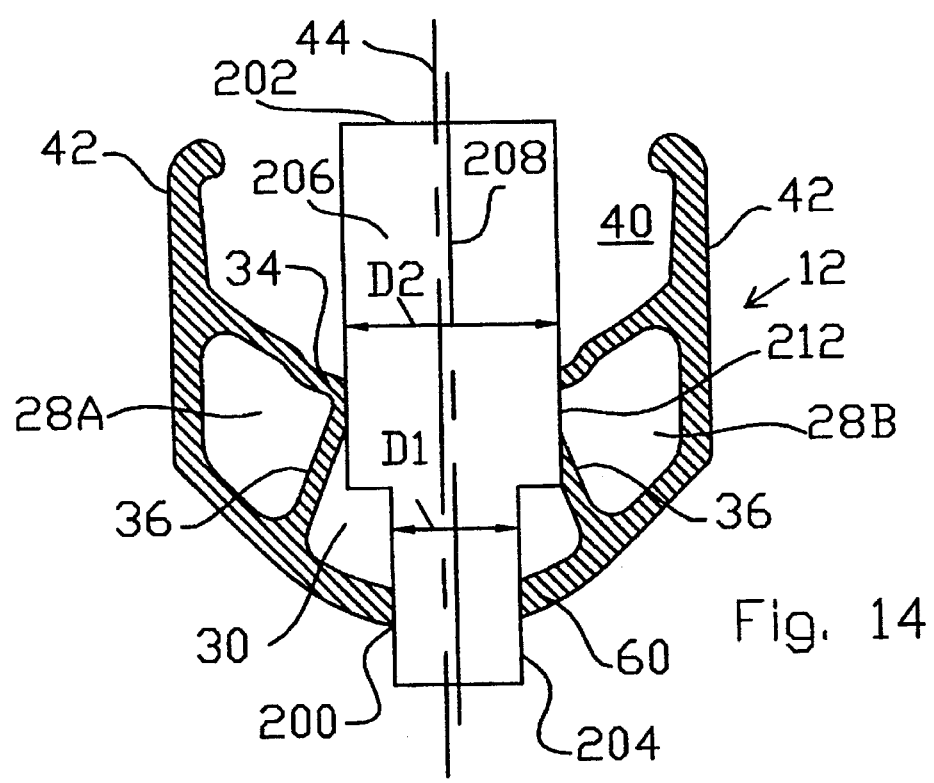
FIG. 14 is a view similar to FIG. 2, but showing the drilling operation to form a venting passage on the opposite side of the central axis.

FIGS. 13 and 14 illustrate a drilling operation and the resultant passages formed in the rim 12. As illustrated forming a spoke receiving hole 200 in the bottom wall 38, portion 60 of the rim 12, requires drilling through the wall 34, i.e. through the top of the central cavity 30 and then through the bottom wall 60. In the illustrated arrangement a stepped drill 202 has a small diameter leading section 204 of a diameter $d_1$ and is stepped into a larger section 206 having a diameter $d_2$. In FIG. 13, the center line of the drill indicated by the line 208 has been shifted to the left of the central plane 44 so that the holes 200 and 204 formed by the small and large diameter section of the drill respectively are shifted to the left by an amount sufficient so that the larger diameter section 206 of the drill drills through wall 36 of the passage 28A to form a venting passage 210 radially outward of the spoke receiving hole 200.

In FIG. 14, the rotational axis of the drill 208 has been shifted to the right of the central plane 44 so that the hole 200 is to the right of the central plane and a hole 212 is formed in the wall 36 between the passage 28B and the central passage 30 to thereby vent the right hand passage 28B into the passage 30 and thus to the spoke hole 200.

It will be apparent there is a staggered relationship of the shifting the drill to opposite sides of the plane 44 to provide a staggered arrangements of holes 210 and 212 circumferentially of the wheel rim 12 and staggered corresponding with the manner in which the spokes are to be secured to the opposed flanges of the central hub 20.

It will also be apparent that with some rim cross sections the spoke hole will not be positioned on opposite sides of the central plane 44 but will be along the central plane and vent holes will be formed on opposite sides of each spoke hole as opposed to the staggered relationship above described.

Having described the invention, modifications will be evident to those skilled in the art without departing from the scope of the invention as defined in the appended claims.

We claim:

1. A wheel rim comprising a circumferentially extending rim member having a pair of adjacent ends, coupling means forming a joint connecting said adjacent ends of said rim member to form said wheel rim, passage means in said rim member extending circumferentially of said wheel rim, said coupling means including pin means extending circumferentially of said rim across said joint and extending along and cooperating with said passage means on opposite circumferential sides of said joint, at least one of said passage means and said pin means having resiliently bendable arm means, said arm means contacting said other of said passage means and said pin means along areas of said passage means spaced circumferentially around a cross sectional shape of said passage means with said arm means being subjected to resilient bending stresses between said areas when said arm means are forced from a relaxed condition to a resiliently bent condition when said pin means is forced into said passage means and wherein arm means in said resiliently bent condition applies pressure in said areas against said other of said pin means and said passage means to retain said pin means in said passage means and hold said joint in closed position forming said wheel from said rim member.

2. A wheel rim as defined in claim 1 wherein said arm means are an integral part of said pin means.

3. A wheel rim as defined in claim 2 wherein cross-section of said passage means and its cooperating pin means are shaped to position said areas to apply forces from said arm means in said bent condition to said passage means having significant force components at said areas directed to minimize lateral bulging at said joint.

4. A wheel rim as defined in claim 2 wherein said passage means has at least one pair of filleted corners and wherein two of said areas are located one in each of said corners of said at least one pair of corners.

5. A wheel rim as defined in claim 3 wherein said passage means has at least one pair of filleted corners and wherein two of said areas are located one in each of said corners of said at least one pair of corners.

6. A wheel rim as defined in claim 1 wherein said passage means comprises a pair of passages positioned one adjacent to each side edge of said rim and wherein said pin means comprise a pair of pins, one for each of said passages.

7. A wheel rim as defined in claim 2 wherein said passage means comprises a pair of passages positioned one adjacent to each side edge of said rim and wherein said pin means comprise a pair of pins, one for each of said passages.

8. A wheel rim as defined in claim 3 wherein said passage means comprises a pair of passages positioned one adjacent to each side edge of said rim and wherein said pin means comprise a pair of pins, one for each of said passages.

9. A wheel rim as defined in claim 4 wherein said passage means comprises a pair of passages positioned one adjacent to each side edge of said rim and wherein said pin means comprise a pair of pins, one for each of said passages.

10. A wheel rim as defined in claim 5 wherein said passage means comprises a pair of passages positioned one adjacent to each side edge of said rim and wherein said pin means comprise a pair of pins, one for each of said passages.

11. A wheel rim as defined in claim 2 further comprising a setable material substantially filling space between the inner periphery of said passage and said arm means, said material having a compression strength when set sufficient to substantially prevent movement of said arms means.

12. A wheel rim as defined in claim 3 further comprising a setable material substantially filling space between the inner periphery of said passage and said arm means, said material having a compression strength when set sufficient to substantially prevent movement of said arms means.

13. A wheel rim as defined in claim 4 further comprising a setable material substantially filling space between the inner periphery of said passage and said arm means, said material having a compression strength when set sufficient to substantially prevent movement of said arms means.

14. A wheel rim as defined in claim 5 further comprising a setable material substantially filling space between the inner periphery of said passage and said arm means, said material having a compression strength when set sufficient to substantially prevent movement of said arms means.

15. A wheel rim as defined in claim 4 wherein said passage means has a outside wall and at a radial outward side and said at least one pair of corners includes a corner positioned adjacent to said outside wall of said passage means and at said radial outward side of said passage.

16. A wheel rim as defined in claim 5 wherein said passage means has a outside wall and at a radial outward side and said at least one pair of corners includes a corner positioned adjacent to said outside wall of said passage means and at said radial outward side of said passage.

17. A wheel rim as defined in claim 13 wherein said passage means has a outside wall and at a radial outward side and said at least one pair of corners includes a corner positioned adjacent to said outside wall of said passage means and at said radial outward side of said passage.

* * * * *